United States Patent [19]

Walker

[11] Patent Number: 5,881,305

[45] Date of Patent: Mar. 9, 1999

[54] REGISTER RENAME STACK FOR A MICROPROCESSOR

[75] Inventor: Wade A. Walker, Austin, Tex.

[73] Assignee: Advanced Micro Devices, Inc., Sunnyvale, Calif.

[21] Appl. No.: 766,509

[22] Filed: Dec. 13, 1996

[51] Int. Cl.$^6$ .................................................. G06F 9/30
[52] U.S. Cl. ................ 395/800.23; 395/393; 395/569
[58] Field of Search .......................... 395/569, 800.23, 395/393, 394, 395

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/391 |
| 4,858,105 | 8/1989 | Kuriyama et al. | 395/582 |
| 4,928,223 | 5/1990 | Dao et al. | 395/597 |
| 4,992,938 | 2/1991 | Cocke et al. | 395/393 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,226,126 | 7/1993 | McFarland et al. | 395/394 |
| 5,226,130 | 7/1993 | Favor et al. | 395/585 |

(List continued on next page.)

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes on Intel P6," BYTE, Jan. 1996, 4 pages.

Gwennap, L, "Hal Reveals Multichip SPARC Processor; High Performance CPU for Hal Systems Only—No Merchant Sales," Microprocessor Report, Mar. 6, 1995, vol. 9, No. 3, 7 pages.

Gwennap, L, "MIPS R10000 Uses Decoupled Architecture—High Performance Core Will Drive MIPS High–End for Years," Microprocessor Report, Oct. 24, 1994, vol. 8, No. 14, 5 pages.

*Primary Examiner*—Larry D. Donaghue
*Attorney, Agent, or Firm*—Conley, Rose & Tayon, PC; B. Noel Kivlin; Lawrence J. Merkel

[57] ABSTRACT

A register rename unit employs a rename map stack upon which a register rename map corresponding to each dispatched instruction is pushed. Upon occurrence of an exception, the register rename maps corresponding to instructions subsequent to the instruction experiencing the exception are popped from the stack. In this manner, the architected register to implemented register mapping consistent with the instruction experiencing the exception is restored. According to one embodiment, the rename map stack can be recovered from an exception in one clock cycle. In one particular implementation, the rename map stack comprises multiple independent stacks. Each independent stack corresponds to one of the architected registers, and stores implemented register specifiers corresponding to that architected register. When an instruction is dispatched, stacking the corresponding register rename map comprises pushing the implemented register specifier assigned to the destination operand of the instruction onto the independent stack corresponding to the destination architected register. The remaining independent stacks remain unchanged. The register rename map corresponding to the instruction is represented by the top of each of the independent stacks subsequent to pushing the implemented register specifier corresponding to the destination operand.

19 Claims, 9 Drawing Sheets

U.S. PATENT DOCUMENTS

| | | | |
|---|---|---|---|
| 5,519,841 | 5/1996 | Sager et al. | 711/202 |
| 5,524,262 | 6/1996 | Colwell et al. | 395/800.23 |
| 5,630,149 | 5/1997 | Bluhm | 395/393 |
| 5,675,759 | 10/1997 | Shebanow et al. | 395/393 |
| 5,694,564 | 12/1997 | Alsup et al. | 395/392 |
| 5,758,112 | 5/1998 | Yeager et al. | 395/393 |
| 5,778,245 | 7/1998 | Papworth et al. | 395/800.23 |
| 5,794,024 | 8/1998 | Golla et al. | 395/569 |

REGISTER RENAME STACK FOR A MICROPROCESSOR

BACKGROUND OF THE INVENTION

1. Field of the Invention

This invention relates to microprocessors and, more particularly, to register renaming mechanisms in microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Generally speaking, a given instruction has one or more source operands which are input values to be operated upon by the microprocessor in response to the given instruction. Each source operand is specified by the instruction via a source operand specifier. The source operand specifier defines a storage location which stores the corresponding source operand. In the x86 microprocessor architecture, for example, a source operand may be stored in a register or a memory location. Other microprocessor architectures specify that source operands are stored only in registers, except for load and store instructions which transfer values between registers and memory locations. Additionally, the given instruction typically has a destination operand. The destination operand is the result of the instruction. A destination operand is stored into a location specified by a destination operand specifier, which may specify a register or a memory location in the x86 microprocessor architecture and may be limited to registers only in certain other microprocessor architectures.

In order to locate a larger number of instructions which may be concurrently executed, superscalar microprocessors often employ out of order execution. If instructions are executed in order (i.e. "program order", or the order of instructions as listed in the program sequence being executed), then the number of instructions which may be concurrently executed is limited by dependencies between the instructions. A dependency exists between a first instruction and a second instruction if the second instruction receives a value produced via execution of the first instruction (the "result" of the first instruction) as a source operand. Since the second instruction needs the result of the first instruction prior to executing, the first and second instructions cannot be concurrently executed. However, an instruction subsequent to the second instruction which does not depend upon either the first instruction or the second instruction may be concurrently executed with the first instruction.

Unfortunately, out of order execution may generate "false dependencies". A false dependency exists between a first instruction and a second instruction subsequent to the first instruction if both instructions reference the same storage location and the first instruction must access the storage location prior to the second instruction in order for correct operation to occur. The second instruction writes the storage location in false dependency situations. False dependencies are divided into two types: write after write dependencies and write after read dependencies. A write after write dependency exists if both instructions write the same storage location. The first instruction must write the storage location first, and the second instruction write the storage location thereafter, such that the update made by the second instruction exists in the storage location subsequent to execution of the two instructions. Similarly, a write after read dependency exists if the first instruction reads the storage location and the second instruction writes the storage location. The read must be performed first so that the first instruction receives the value stored in the storage location prior to update in response to the second instruction.

A technique referred to as register renaming is often used to eliminate false dependencies in a microprocessor employing out of order execution. A microprocessor using register renaming typically has a larger implemented register set than architected register set. As used herein, a register is a storage device used to store the operands of instructions.

Source and destination register operand specifiers of an instruction identify one of a set of architected registers. Architected registers are defined by the microprocessor architecture employed by a given microprocessor. The number of architected registers is defined, as well as any special properties assigned to certain of the architected registers. The architected registers are the registers which can be specified by the programmer of an instruction sequence to store various values used by the instruction sequence.

On the other hand, the implemented register set comprises the registers actually implemented by the microprocessor. The number of implemented registers is at least equal to the number of architected registers, and is often substantially larger than the number of architected registers. As instructions are fetched and dispatched for execution, the destination operand of each instructions may be assigned to one of the implemented registers. In other words, the implemented register is "renamed" to be the destination architected register. Alternatively, the destination architected register can be considered to be renamed to the selected implemented register. The rename is maintained until a subsequent instruction overwrites the architected register, at which time another implemented register may be selected as the rename. Even though the same architected register may be updated by two instructions, different implemented registers are used to store the two destination operands. A particular instruction which reads the architected register being updated (i.e. uses the architected register's contents as a source operand) is directed to read the implemented register assigned to the first of the two instructions in program order if the particular instruction is between the two instructions in program order. A particular instruction subsequent to the second of the two instructions in program order is directed to read the implemented register assigned to the destination of the second of the two instructions. In this manner, false dependencies are eliminated by directing each update of a particular architected register to a different implemented register.

Unfortunately, register renaming complicates recovery from exceptions. Generally, an exception is a condition occurring upon execution of a particular instruction which causes instruction fetch and execution to transfer to a set of instructions not currently being fetched and executed by the microprocessor. For example, a branch misprediction is an exception. The instructions fetched beyond the mispredicted branch instruction are from an instruction stream other than the actual instruction stream being executed by the microprocessor. Therefore, these instructions must be discarded and instructions from the correct instruction stream fetched and executed. Similarly, an instruction may experience architecturally defined exceptions. For example, an instruction having a memory operand often specifies the memory operand via a virtual address which must be translated to a physical address of a main memory location via a predefined translation mechanism. If no translation is defined with the translation mechanism for the virtual address, an exception is generated for that instruction.

When previously fetched (and potentially executed) instructions are discarded due to an exception, the results which have been created by those instructions must be discarded as well. Essentially, the state of the architected registers must be restored to the state of these registers at the point in the program sequence at which the exception is detected. In the case of register renaming, this requirement translates to restoring the mapping of architected registers to implemented registers to a mapping consistent with the execution of instructions prior to the instruction experiencing the exception. Depending upon the type of exception, the instruction experiencing the exception may be executed or not executed. For example, a branch misprediction exception is an exception for which the corresponding branch instruction is executed. On the other hand, a failed virtual address translation for a memory operand of an instruction is an exception for which the corresponding instruction is not executed (the memory operand cannot be located, so the corresponding instruction cannot be executed). A method for restoring a register rename map to a state consistent with the execution of a particular instruction is therefore needed.

SUMMARY OF THE INVENTION

The problems outlined above are in large part solved by a register rename unit in accordance with the present invention. The register rename unit employs a rename map stack upon which a register rename map corresponding to each dispatched instruction is pushed. Upon occurrence of an exception, the register rename maps corresponding to instructions subsequent to the instruction experiencing the exception are popped from the stack. In this manner, the architected register to implemented register mapping consistent with the instruction experiencing the exception is restored. Instructions fetched in response to the exception are thereby directed to the implemented registers consistent with the exception, and results of instructions executed subsequent to the instruction experiencing the exception are discarded. Advantageously, the state of the architected registers corresponding to any instruction may be recovered using the rename map stack described herein. According to one embodiment, the rename map stack can be recovered from an exception in one clock cycle. Advantageously, a complex multi-cycle recovery sequence may be avoided.

According to one particular implementation, the rename map stack comprises multiple independent stacks. Each independent stack corresponds to one of the architected registers, and stores implemented register specifiers corresponding to that architected register. When an instruction is dispatched, stacking the corresponding register rename map comprises pushing the implemented register specifier assigned to the destination operand of the instruction onto the independent stack corresponding to the destination architected register. The remaining independent stacks remain unchanged. The register rename map corresponding to the instruction is represented by the top of each of the independent stacks subsequent to pushing the implemented register specifier corresponding to the destination operand. Advantageously, the storage needed to form a register rename map is less than that required to store a complete register rename map for each instruction. While a complete register rename map occupies storage proportional to the number of architected registers multiplied by the number of bits in an implemented register specifier, the particular implementation occupies storage space proportional to the number of bits in an implemented register specifier. A proportionally smaller amount of total storage space may be used to approximate a similar number of register rename maps stored.

Broadly speaking, the present invention contemplates a microprocessor comprising a register file and a register rename unit. The register file includes a plurality of implemented registers, wherein a number of the plurality of implemented registers is at least equal to a number of architected registers specified by an instruction set employed by the microprocessor. Coupled to the register file, the register rename unit is configured to maintain a set of register rename maps. Each instruction within an instruction processing pipeline of the microprocessor corresponds to a different register rename map within the set. Furthermore, each register rename map within the set includes an implemented register specifier corresponding to each of the architected registers. The implemented register specifier identifies one of the plurality of implemented registers which corresponds to the architected register upon execution of the instruction corresponding to the register rename map and upon execution of instructions preceding the instruction in program order.

The present invention further contemplates a method for performing register renaming. A register rename map corresponding to each instruction within an instruction stream being executed in a microprocessor is formed. The register rename map maps an implemented register assigned to the instruction to an architected register specified as a destination of the instruction. Additionally, the register rename map retains a mapping of remaining architected registers to implemented registers as generated for instructions prior to the instruction in program order. The register rename maps corresponding to instructions within an instruction processing pipeline of the microprocessor are stacked in a rename map stack.

The present invention still further contemplates a register rename unit for a microprocessor, comprising a rename map stack and a control unit. The rename map stack is configured to store a plurality of register rename maps, wherein each of the plurality of register rename maps identifies a correspondence between each of a set of architected registers for the microprocessor and a corresponding one of a set of implemented registers in the microprocessor. Coupled to the rename map stack, the stack control unit is coupled to receive an implemented register specifier assigned to a destination operand of an instruction. Additionally, the stack control unit is configured to form a particular register rename map by updating a top rename map stored at a top of the rename map stack with the implemented register specifier. Subsequently, the stack control unit pushes the particular register rename map onto the rename map stack. The stack control unit is configured to form and push additional rename maps for each instruction fetched by the microprocessor.

Additionally, the present invention contemplates a register rename map stack comprising a first stack and a second stack. The first stack corresponds to a first architected register, and is configured to store implemented register specifiers assigned to the first architected register. The second stack corresponds to a second architected register, and is configured to store implemented register specifiers assigned to the second architected register. A top of the first stack and a top of the second stack comprise a first register rename map. A second register rename map is formed by pushing another implemented register specifier onto the first stack while the second stack remains unchanged.

BRIEF DESCRIPTION OF THE DRAWINGS

Other objects and advantages of the invention will become apparent upon reading the following detailed description and upon reference to the accompanying drawings in which.

Figure 1:
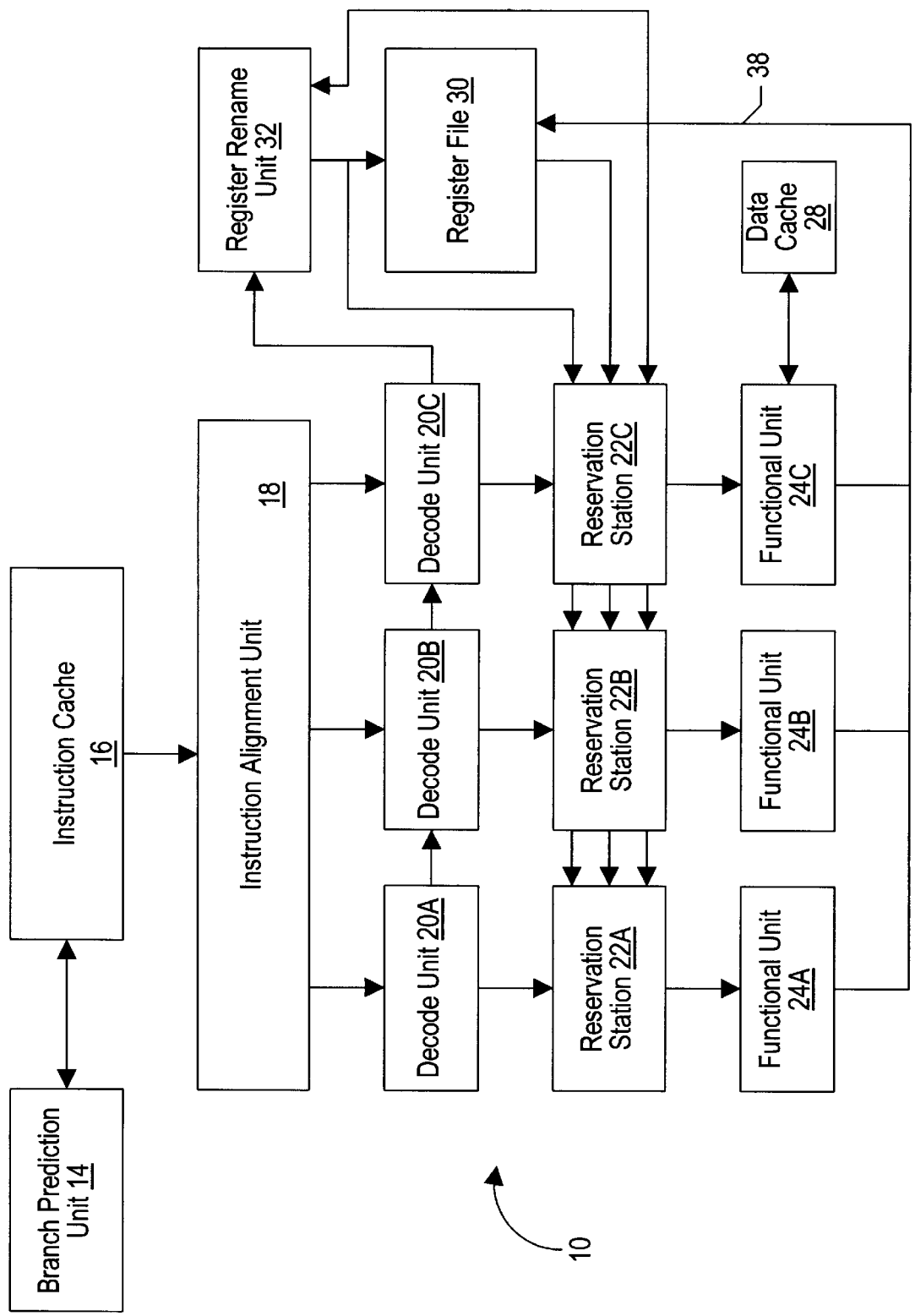
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a branch prediction unit 14, an instruction cache 16, an instruction alignment unit 18, a plurality of decode units 20A–20C, a plurality of reservation stations 22A–22C, a plurality of functional units 24A–24C, a data cache 28, a register file 30, and a register rename unit 32. Elements referred to herein with a particular reference number followed by a letter will be collectively referred to by the reference number alone. For example, decode units 20A–20C will be collectively referred to as decode units 20.

Instruction cache 16 is coupled to receive instructions from a main memory subsystem (not shown), and is further coupled to branch prediction unit 14. Instruction cache 16 is still further coupled to instruction alignment unit 18. Instruction alignment unit 18 is in turn coupled to decode units 20.

Each decode unit 20A–20C is coupled to respective reservation stations 22A–22C, and is further coupled to register rename unit 32. Reservation stations 22A–22C are further coupled to respective functional units 24A–24C, register rename unit 32, and register file 30. Functional units 24 are coupled to register file 30 and register rename unit 32. Data cache 28 is coupled to one or more functional units 24 and to the main memory subsystem.

Generally speaking, register rename unit 32 is configured to receive architected register specifiers from decode units 20. The architected register specifiers correspond to the instructions being decoded within the decode units 20. For each source operand specifier, register rename unit 32 provides the implemented register specifier which corresponds to the source operand specifier (i.e. the implemented register which was assigned to the destination operand of the last instruction, in program order, to update the architected register identified by the source operand specifier). For each destination operand specifier, register rename unit 32 assigns an implemented register to store the destination operand. The selected implemented register is an "idle implemented register". As used herein, an idle implemented register is an implemented register which is either: (i) not assigned to a previously decoded instruction; or (ii) assigned to a previously decoded instruction and a non-speculative instruction subsequent to the previously decoded instruction updates the same architected register. A particular instruction is non-speculative if each instruction prior to the particular instruction (in program order) which has yet to execute is incapable of producing an exception.

Register rename unit 32 employs a rename map stack which stores a register rename map corresponding to each instruction. The register rename map identifies the implemented registers which correspond to each of the architected registers upon execution of the corresponding instruction. More particularly, the register rename map corresponding to a particular instruction stores an implemented register specifier assigned to the particular instruction for the architected register which is the destination of the instruction. Other architected registers in the register rename map are mapped to the implemented register which is assigned to the instruction prior to the particular instruction which is the last (in program order) to update that architected register. In other words, the state of the architected registers at a point in time immediately subsequent to the execution of the particular instruction (if instructions were executed in program order) is the state of the implemented registers indicated in the corresponding register rename map upon execution of each of the instructions prior to the particular instruction and the particular instruction itself.

As each instruction is dispatched, a corresponding rename map is pushed onto the rename map stack. A tag identifying the corresponding rename map is conveyed with the instruction. If an exception is detected for the instruction, the tag is conveyed to register rename unit 32. Register rename unit 32 restores the indicated rename map to the top of the rename map stack (i.e. pops the rename maps for instructions subsequent to the instruction experiencing the exception off the stack). Since the rename map is identified by the tag, and since a rename map corresponding to each instruction is stored in the rename map stack, the state of the rename map may be recovered from the exception by popping the rename map stack alone. According to one embodiment of the rename map stack, the rename map stack can be recovered from any exception in one clock cycle. Advantageously, the rename map needed to dispatch instructions from the correct instruction stream (i.e. the instruction stream indicated by the exception) is created quickly. Instructions from the correct instruction stream are not stalled by a multiple-cycle recovery sequence.

In one particular embodiment, the rename map stack comprises multiple independent stacks. Each independent stack corresponds to one of the architected registers. For this embodiment, forming a register rename map corresponding to a particular instruction comprises pushing the implemented register specifier assigned to the destination operand of the particular instruction onto the independent stack corresponding to the architected register specified by the particular instruction as the destination. Advantageously, a proportionally smaller amount of storage is occupied by each additional map. In other words, instead of storing an implemented register specifier corresponding to each architected register upon dispatch of the particular instruction, only the implemented register specifier assigned to the destination of the particular instruction is stored. Since the remaining architected registers are unaffected by the particular instruction, the implemented register specifiers at the top of the corresponding independent stacks reflect the state of the remaining architected registers with respect to the particular instruction. Therefore, a relatively small amount of stack storage may be employed while still allowing a large number of instructions to be outstanding within the instruction processing pipeline of the microprocessor. For example, if microprocessor 10 employs the x86 microprocessor architecture with its eight architected registers, then the stack comprising eight independent stacks may be approximately ⅛th the size of a stack which stacks an entire rename map for each instruction being dispatched.

As used herein, the term "stack" refers to a storage device using a last-in, first-out (LIFO) protocol for items being stored. In other words, when an item is removed from the stack, the item removed is the item most recently stored therein. Placing an item onto the stack is referred to as "pushing" the item. The item placed onto the stack becomes the top of the stack (i.e. the item to be removed first), and the item formerly at the top of the stack becomes second to the top. Removing an item from the stack is referred to as "popping" the stack. The item at the top of the stack is removed, and the item formerly second to the top of the stack becomes the item at the top of the stack.

Instruction cache 16 is a high speed cache memory provided to store instructions. Instructions are fetched from instruction cache 16 and dispatched to decode units 20. It is noted that instruction cache 16 may be implemented as a fully associative, set associative, or direct mapped configuration.

Instructions are fetched from main memory and stored into instruction cache 16 upon detection of a miss therein. Instructions may be prefetched prior to the request thereof from instruction cache 16 in accordance with a prefetch scheme. It is noted that instruction cache 16 may store predecode bits which indicate the boundaries of instructions within the instruction cache line for embodiments of microprocessor 10 which employ variable byte length instruction sets (e.g. the instruction set defined by the x86 microprocessor architecture). Furthermore, certain embodiments of microprocessor 10 may employ a microcode unit for microcode complex instructions as a series of simpler instructions.

Microprocessor 10 employs branch prediction in order to speculatively fetch instructions subsequent to conditional branch instructions. Branch prediction unit 14 is included to perform branch prediction operations. In one embodiment, multiple branch target addresses are stored with respect to each cache line in instruction cache 16. Updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. Instruction alignment unit 18 locates instructions within the instruction bytes fetched from instruction cache 16 and aligns an instruction to each of decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. It is noted that embodiments of microprocessor 10 which use fixed-byte length instructions may eliminate instruction alignment unit 18. It is further noted that, if instruction cache 16 is configured to store predecode data identifying instruction boundaries, instruction alignment unit 18 may use the predecode data to aid in location and dispatch of instructions.

Decode units 20 are configured to decode instructions received from instruction alignment unit 18. Register operand information is detected and routed to register rename unit 32. Register rename unit 32 assigns an implemented register specifier to each of the register operands, and communicates the assigned implemented register specifiers (the "renames") to reservation stations 22 and register file 30. Register file 30 conveys the values stored in the specified implemented registers to reservation stations 22. Additionally, decode units 20 decode each instruction into a set of control values for functional units 24, and these control values are dispatched to reservation stations 22 along with operand address information and displacement or immediate data which may be included with the instruction.

Microprocessor 10 supports out of order execution, and thus employs register rename unit 32 to supply register renames for elimination of false dependencies. Instructions may execute in any order and may store their results into register file 30. Register rename unit 32 is further configured to maintain a stack of register rename maps. Each register rename map identifies the implemented registers which correspond to each architected register upon execution of an instruction which corresponds to that register rename map. If an exception is detected upon execution of a particular instruction, the rename map corresponding to that instruction is restored to the top of the stack, thereby discarding results corresponding to instructions subsequent to the instruction for which an exception is detected. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. One or more preceding instructions may be exception-causing instructions, in which case the speculative results may be discarded by register rename unit 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Register file 30 comprises the implemented register set employed by microprocessor 10. In one embodiment of microprocessor 10 employing the x86 microprocessor architecture, the architected register set comprises eight 32 bit registers (i.e. EAX, EBX, ECX, EDX, ESP, EBP, ESI, and EDI). The implemented register set comprises, according to one embodiment, sixty-four 32 bit registers. Each implemented register is configured to store a value, as well as a "written" bit indicating that the value has been written. The written bit is reset when the implemented register is assigned as a rename for a destination of a given instruction, and is set upon writing the register via functional units 24. When a register within register file 30 is read via renames supplied by register rename unit 32, the valid bit is conveyed as well. In this manner, reservation stations 22 may determine if the value corresponding to the implemented register is provided from register file 30 or if reservation stations 22 must monitor results generated by functional units 24 for the value of the architected register corresponding to the implemented register.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update register file 30 (this technique is commonly referred to as "result forwarding"). A result bus 38 is connected between functional units 24, register file 30, and reservation stations 22 for conveying these results. Each functional unit 24, upon execution of a particular instruction, conveys the implemented register specifier assigned to the particular instruction, the tag of the corresponding register rename map in register rename unit 32, the result, and an indication of any exception being generated. Reservation stations 22 monitor the implemented register specifiers to detect forwarding of operands, and monitor the exception indication and map tag for discarding instructions.

In one embodiment, each of the functional units 24 is configured to perform integer arithmetic operations of addition and subtraction, as well as shifts, rotates, logical operations, and branch operations. One or more of the functional units 24 may be configured to perform load/store operations as well, and these functional units 24 are coupled to data cache 28. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded.

Data cache 28 is a high speed cache memory provided to temporarily store data being transferred between load/store unit 26 and the main memory subsystem. It is understood that data cache 28 may be implemented in a variety of specific memory configurations, including a set associative configuration.

Figure 2:
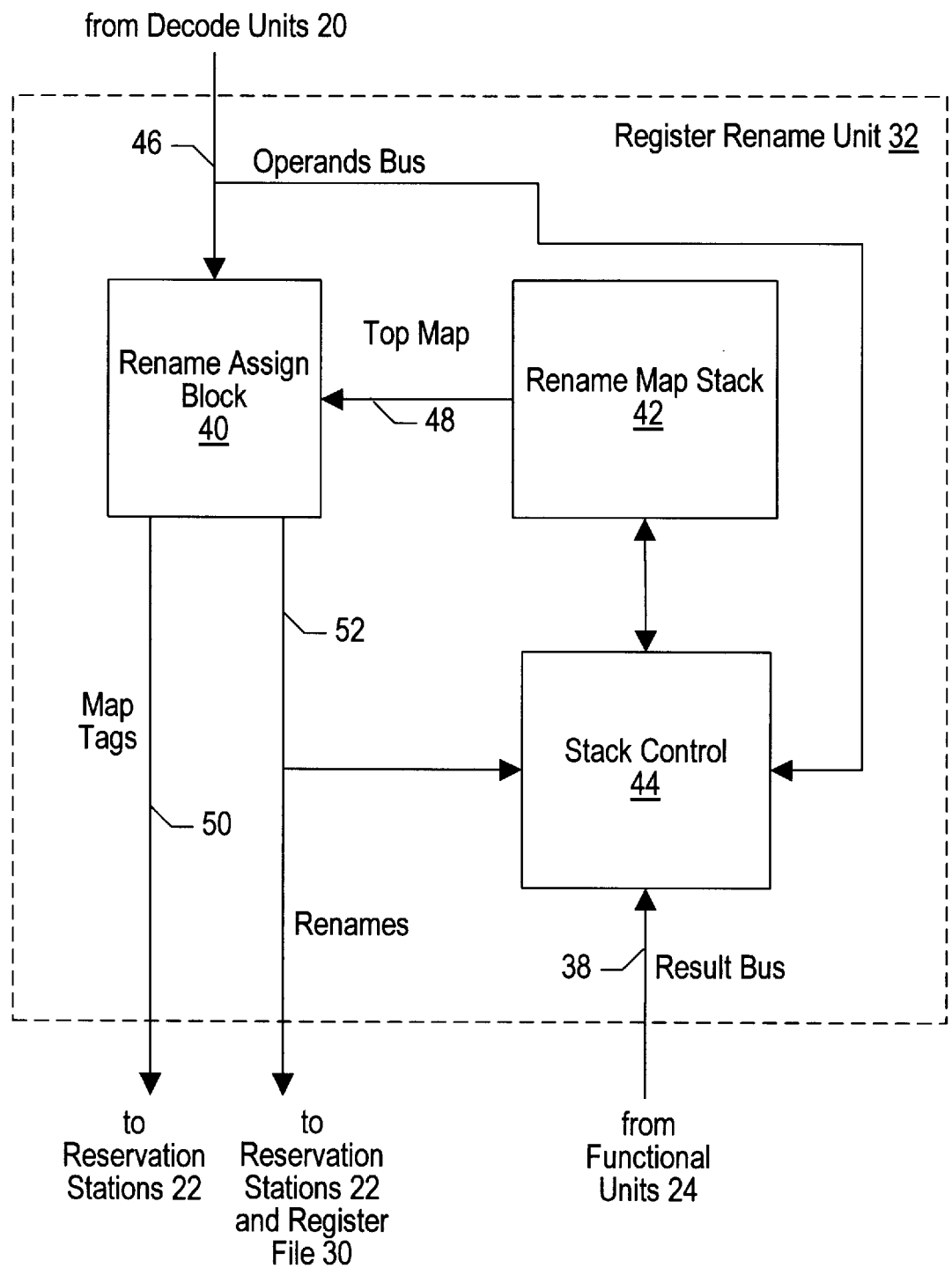
FIG. 2 is a block diagram of one embodiment of a register rename unit shown in FIG. 1.

Turning next to FIG. 2, a block diagram of one embodiment of register rename unit 32 is shown. Other embodiments are contemplated. As shown in FIG. 2, register rename unit 32 includes a rename assign block 40, a rename map stack 42, and a stack control unit 44. An operands bus 46 provided by decode units 20 is coupled to rename assign block 40 and stack control unit 44. Additionally, a top map bus 48 is coupled between rename map stack 42 and rename assign block 40. Rename assign block 40 is further coupled to a map tags bus 50 which is coupled to reservation stations 22, and to a renames bus 52 which is coupled to reservation stations 22, register file 30, and stack control unit 44. Stack control unit 44 is coupled to result bus 38 from functional units 24 and is further coupled to rename map stack 42.

Rename map stack 42 stores a stack of register rename maps. One register rename map is stored for each instruction which is speculatively dispatched into the instruction processing pipeline of microprocessor 10. Preferably, rename map stack 42 includes storage for storing a number of rename maps equal to a maximum number of instructions which may be speculatively dispatched into the instruction processing pipeline of microprocessor 10. However, rename map stack 42 may include less storage and instruction fetch may be stalled upon rename map stack 42 becoming full. Stack control unit 44 pushes additional rename maps onto rename map stack 42 as instructions are dispatched by microprocessor 10. Additionally, upon detection of an exception condition, register rename maps are popped from the top of register rename stack 42 such that the register rename map corresponding to the instruction which experiences the exception is at the top of register rename stack 42.

Rename assign block 40 receives source and destination operand specifiers from decode units 20 upon operands bus 46. Each source and/or destination specifier is encoded to indicate one of the architected registers. Furthermore, decode units 20 signal the validity of each source and/or destination operand specifier. A particular operand specifier may be invalid because the corresponding instruction does not use that operand. Different instructions may include differing numbers of operands. Operands bus 46 conveys the maximum number of operands which may be specified by a particular instruction from each decode unit 20A–20C. Alternatively, a particular operand specifier may be invalid because the particular operand is a memory operand as opposed to a register operand. Still further, the operands provided by a particular decode unit 20A–20C may be invalid if the particular decode unit 20A–20C is not decoding an instruction during a given clock cycle.

Each decode unit 20A–20C is connected to a portion of operands bus 46, upon which that decode unit 20A–20C conveys the source and destination operand specifiers of the instruction being decoded therein. Renames bus 52 is divided into portions corresponding to the portions of operands bus 46. Implemented register specifiers assigned by rename assign block 40 to the source and destination operand specifiers received from a given decode unit 20A–20C are conveyed upon the corresponding portion of renames bus 52. Therefore, a particular reservation station 22A–22C may be coupled to the portion of renames bus 52 which corresponds to the corresponding decode unit 20A–20C. Reservation stations 22 store the implemented register specifiers corresponding to source operand specifiers in order to capture results from result bus 38. The implemented register storing a source operand for an instruction may not be updated upon dispatch of the instruction. Therefore, the source operand is captured from result bus 38 via the result forwarding mechanism described above. Reservation stations 22 store the implemented register specifier corresponding to the destination operand specifier in order to provide that implemented register specifier upon result bus 38 when the corresponding instruction is executed.

Renames bus 52 is additionally coupled to register file 30. Register file 30 accesses each implemented register specified as a source operand upon renames bus 52 and provides the value stored therein as well as the "written" bit. In addition, register file 30 resets the "written" bit for those implemented register specified as the destination for the corresponding instructions.

Reservation stations 22, in addition to receiving implemented register specifiers upon renames bus 52 and corresponding values from register file 30, receive a map tag corresponding to each instruction. Map tags bus 50 is used to convey a map tag for each instruction to the corresponding reservation station 22A–22C. The map tag identifies the register rename map within rename map stack 42 which corresponds to the instruction. When the instruction is executed, the map tag is provided upon result bus 38 so that stack control unit 44 can update the corresponding register rename map as executed. Furthermore, if an exception is detected, the map tag identifies which of the register rename maps in the register rename map stack is to become the top of the register rename map stack in order to restore the register rename map to a state consistent with the occurrence of the exception.

Stack control unit 44 receives renames bus 52 as well. For each instruction dispatched during a clock cycle, stack control unit 44 places a corresponding register rename map onto rename map stack 42. The register rename map corresponding to a particular instruction is formed by taking the register rename map corresponding to the instruction immediately previous to the particular instruction (in program order) and replacing the implemented register specifier for the architected register which is the destination of the particular instruction with the implemented register specifier assigned to the destination operand of the particular instruction. Stack control unit 44 receives the destination operand specifiers upon operands bus 46 and the corresponding implemented register specifiers upon renames bus 52. Since microprocessor 10 as shown in FIG. 1 is a superscalar microprocessor, multiple register rename maps may be pushed onto rename map stack 42 during a particular clock cycle. Each map is logically formed as described above. However, the maps may be formed in parallel by changing two implemented register specifiers in the second map formed during a given clock cycle (i.e. the register specifiers for the first two instructions dispatched during the clock cycle, in program order), etc.

As mentioned above, stacks have a "top" entry which is the last item to be pushed thereon. The items stored in rename map stack 42 are register rename maps. Therefore, the register rename map stored at the top of register rename stack 42 is conveyed upon top map bus 48 to rename assign block 40. In this manner, rename assign block 40 may assign renames to source operands by reading the corresponding implemented register specifiers from the register rename map stored at the top of rename map stack 42.

Figure 3:
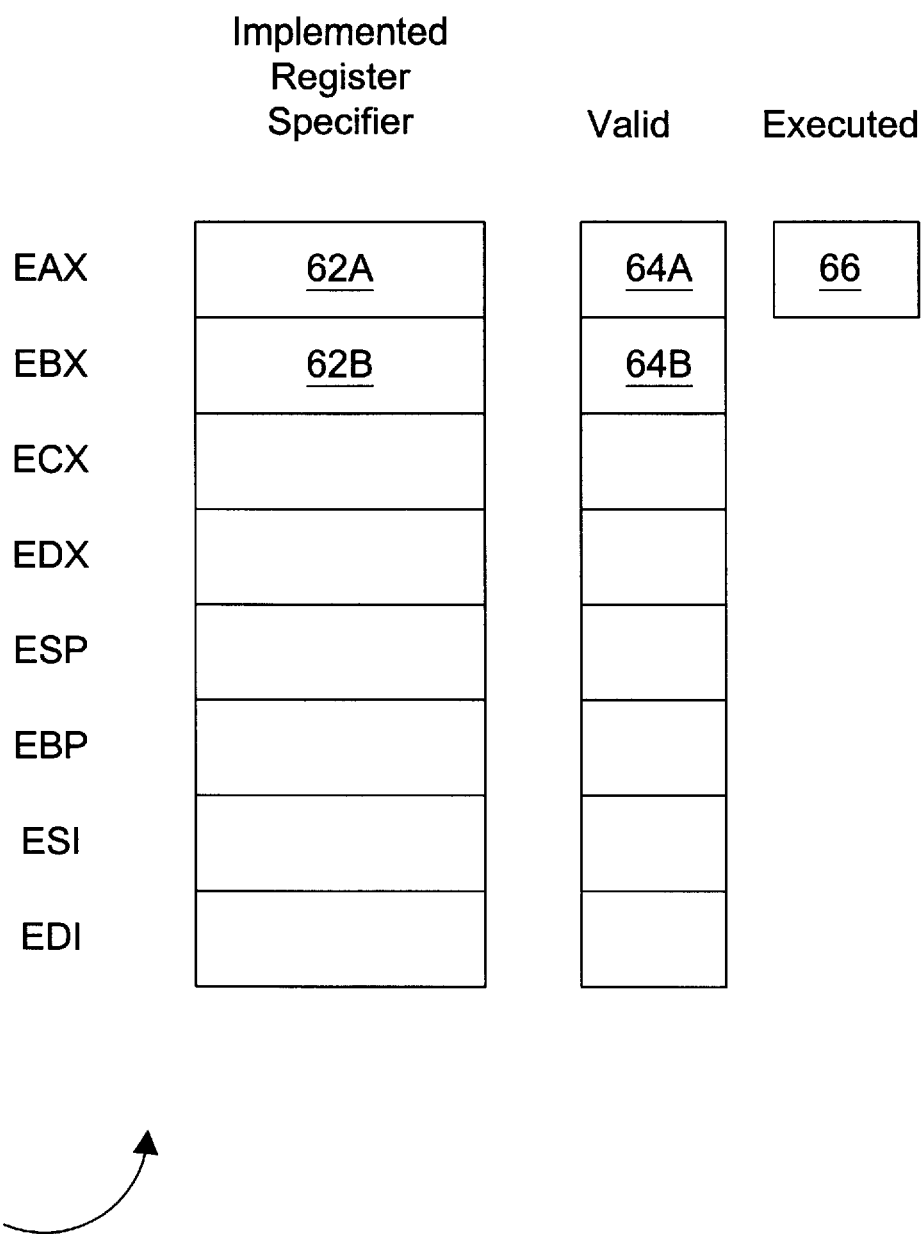
FIG. 3 is a diagram depicting one embodiment of a register rename map.

Turning next to FIG. 3, an exemplary register rename map 60 for use in an embodiment of microprocessor 10 employing the x86 microprocessor architecture is shown. Register rename map 60 includes storage for an implemented register specifier corresponding to each of the architected registers from the x86 microprocessor architecture. For example, implemented register specifier 62A corresponds to the EAX register, implemented register specifier 62B corresponds to the EBX register, etc. Each implemented register specifier 62 includes a number of bits sufficient to identify one of the implemented registers within register file 30. For example, in one embodiment 64 implemented registers comprise register file 30. In this embodiment, 6 bits are used for each implemented register specifier.

In addition to the implemented register specifiers, a valid bit is included in the register rename map for each architected register. For example, a valid bit 64A corresponds to architected register EAX, a valid bit 64B corresponds to architected register EBX, etc. The valid bit 64 indicates that an implemented register currently corresponds to the architected register associated with that valid bit 64. Valid bits 64 are particularly important upon reset of microprocessor 10. At that time, no instructions have updated the architected registers and therefore no implemented registers have been assigned. As instructions are dispatched which update the architected registers, the corresponding valid bits are set and the assigned implemented register specifiers are stored into register rename map 60. If an instruction is dispatched for which a source operand is an architected register and the corresponding valid bit 64 is clear, rename assign block 40 randomly assigns an implemented register specifier to the source operand.

In one embodiment, an executed bit 66 is included in the register rename map 60. Stack control unit 44 sets the executed bit upon detection of the map tag which identifies register rename map 60 within rename map stack 42, if the map tag is not provided along with an indication of exception. A register rename map stored at the bottom of rename map stack 42 may be deleted from rename map stack 42 when the executed bit is set for that register rename map. The rename map may be actively deleted, or may be deleted by pushing additional register rename maps onto the top of register rename stack 42. If register rename stack 42 is full and the executed bit 66 corresponding to the register rename map 60 at the bottom of rename map stack 42 is clear, then instruction dispatch is stalled. It is noted that executed bit 66 may be stored separate from register rename map 60. For example, executed bits 66 from each register rename map 60 stored in rename map stack 42 may be stored in a shift register.

Figure 4:
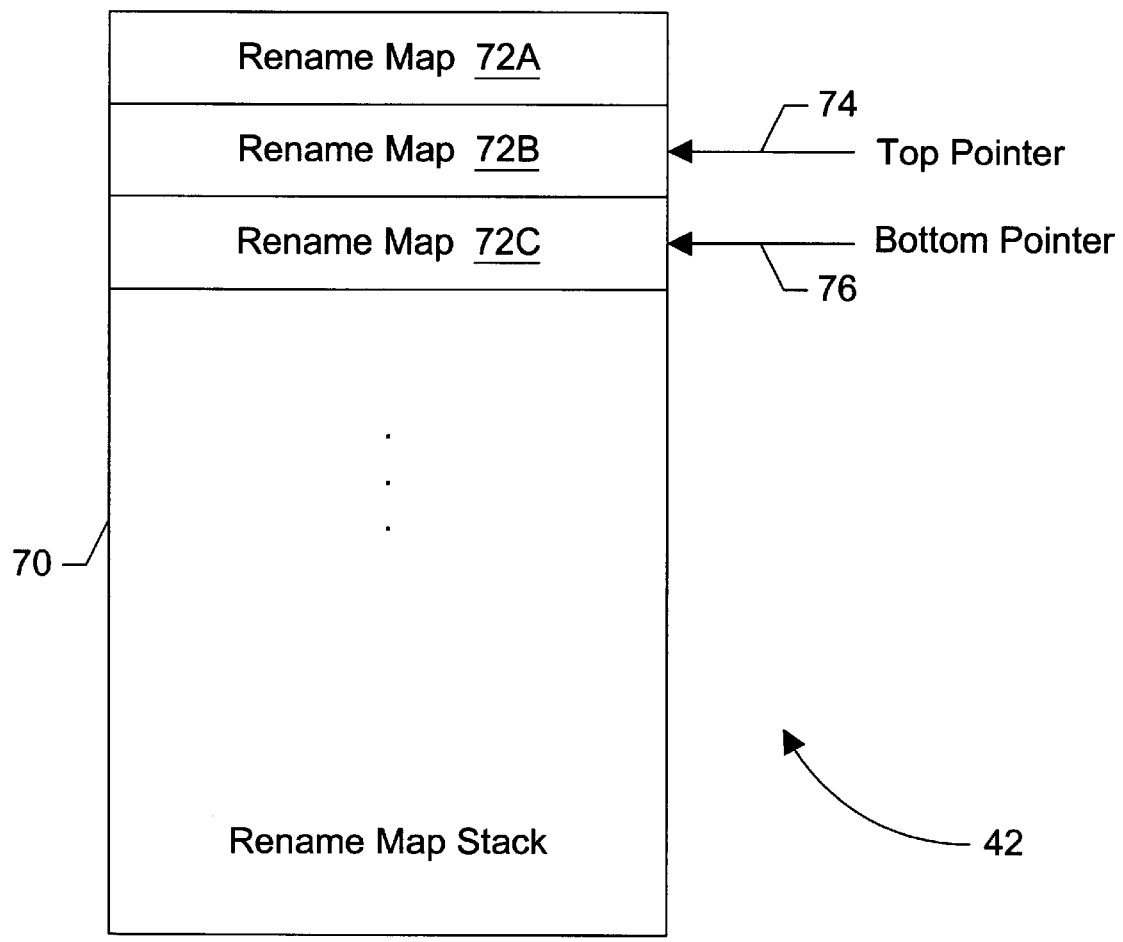
FIG. 4 is a diagram depicting one embodiment of a rename map stack shown in FIG. 2.

Turning now to FIG. 4, a diagram depicting one embodiment of rename map stack 42 is shown. Rename map stack 42 may be implemented as an array 70 of storage locations (such as storage locations 72A, 72B, and 72C) which are configured to store register rename maps. Instead of fixing one storage location 72 as the top of the stack and physically moving register rename maps from one storage location 72 to another in response to a push or pop, the embodiment shown in FIG. 4 employs a top pointer 74 and a bottom pointer 76. The register rename map indicated by top pointer 74 is conveyed upon top map bus 48 to rename assign block 40. When a register rename map is pushed onto rename map stack 42, the register rename map is stored in the storage location 72 adjacent to the storage location 72 indicated by top pointer 74, and top pointer 74 is incremented to indicate the register rename map which is pushed. When rename maps are popped from rename map stack 42, top pointer 74 is decremented to point to the register rename map which is the top of the stack after the popping operation. Bottom pointer 76 indicates which register rename map forms the bottom of rename map stack 42, and is used to determine when the rename map stack 42 is full. Rename map stack 42 is full if: (i) top pointer 74, if incremented, would equal bottom pointer 76; and (ii) the executed bit corresponding to the register rename map indicated by bottom pointer 76 is clear.

It is noted that, if an exception is detected requiring multiple register rename maps to be popped from rename map stack 42, top pointer 74 may be set to the map tag corresponding to the instruction experiencing the exception. Since the storage location storing a particular register renaming map is fixed, the map tag may directly identify the storage location within array 70 which corresponds to a particular instruction.

Figure 5:
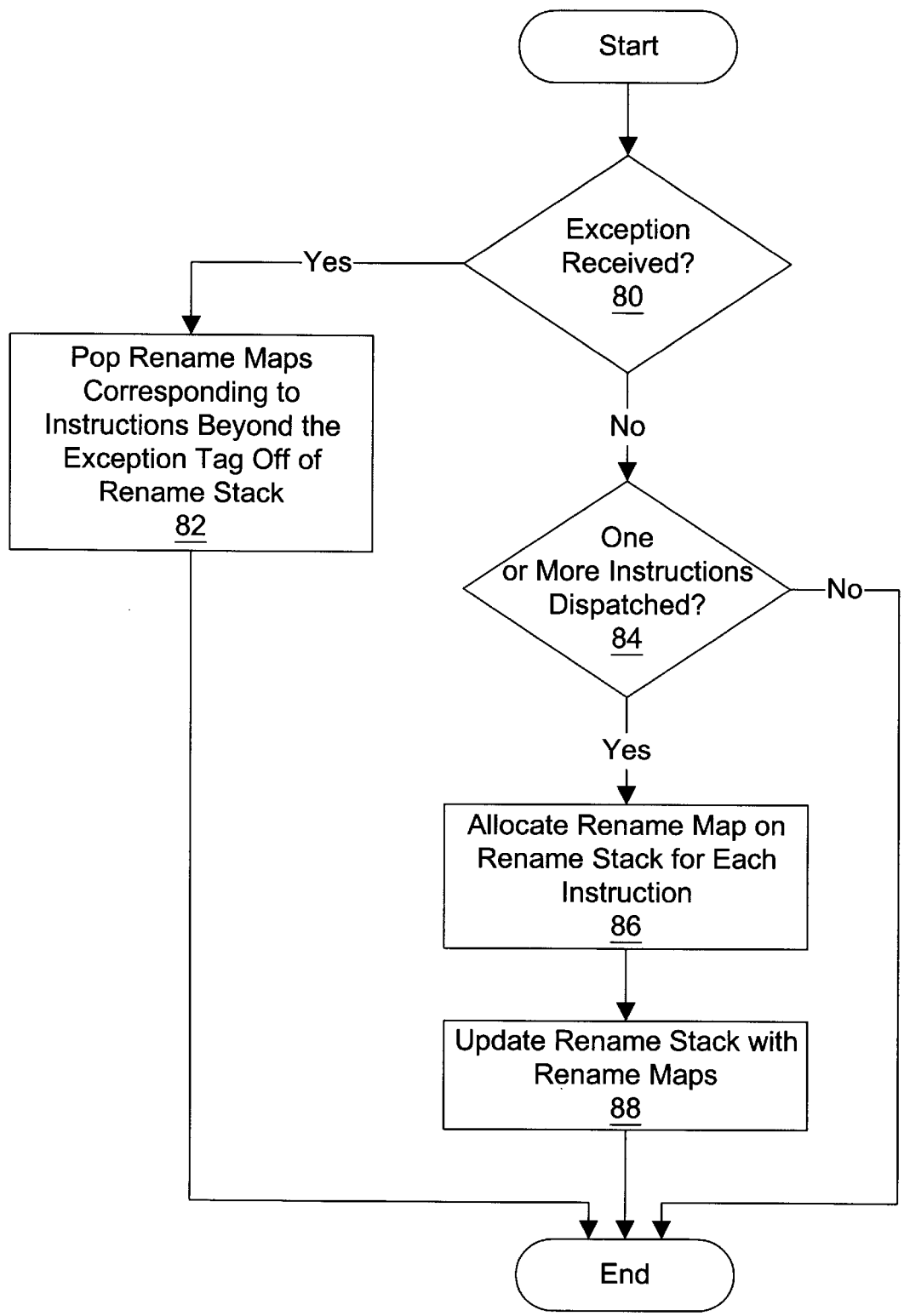
FIG. 5 is a flowchart depicting recovery of the rename map stack shown in FIG. 2 when an exception is detected.

Turning next to FIG. 5, a flowchart illustrating a portion of the operation of one embodiment of stack control unit 44 is shown. Stack control unit 44 first checks to see if any of functional units 24 detect an exception during a clock cycle (decision box 80). If an exception is detected, the register rename maps corresponding to instructions which are subsequent to the instruction experiencing the exception are popped from rename map stack 42 (step 82). It is noted that, in the case of a exceptions which are defined to occur prior to the execution of the corresponding instruction, the register rename map corresponding to the instruction is popped as well.

Figure 6:
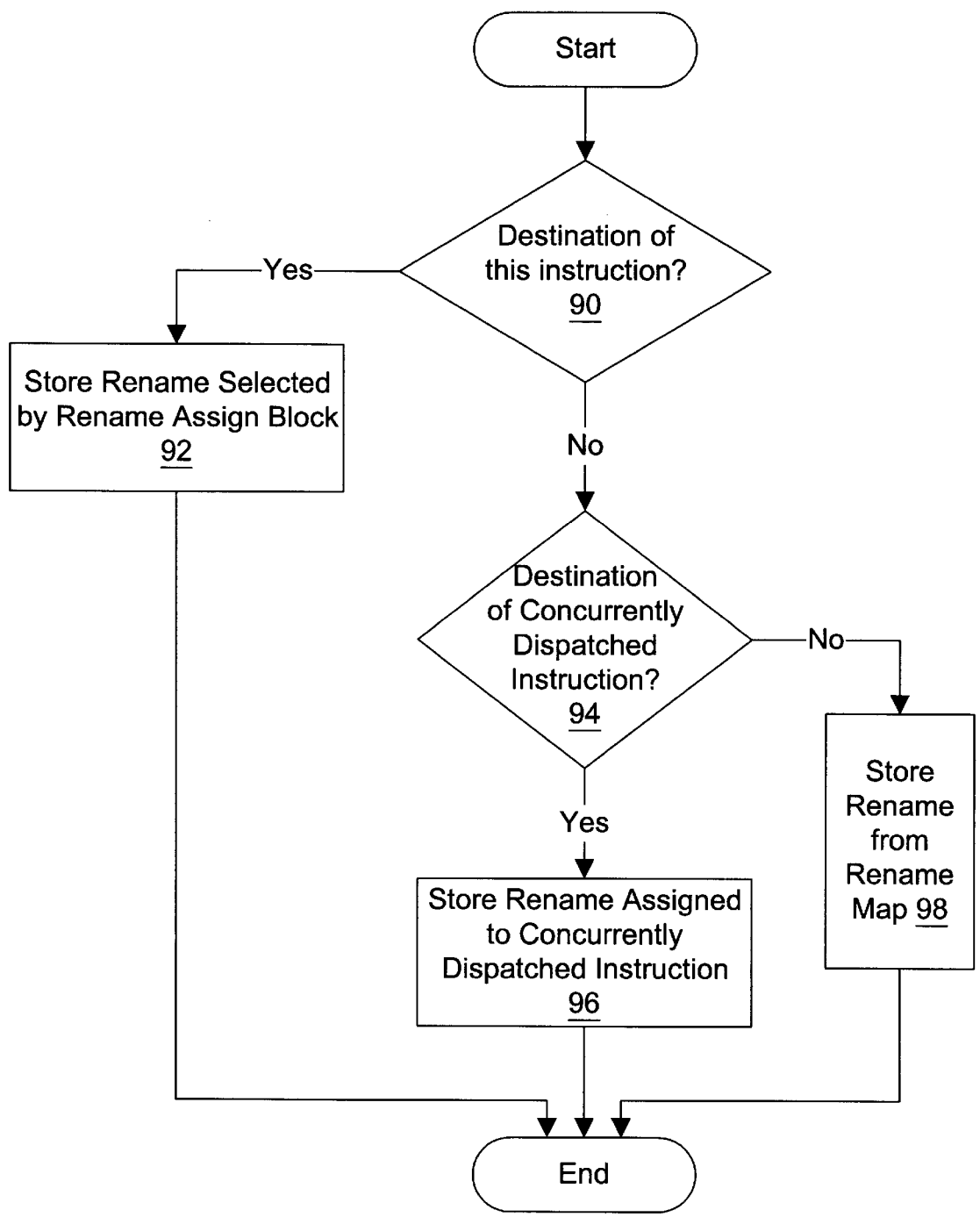
FIG. 6 is a flowchart depicting update of the rename map stack shown in FIG. 2.

If an exception is not indicated during a given clock cycle, stack control unit 44 examines renames bus 52 and operands bus 46 to determine if instructions are being dispatched in the clock cycle (decision box 84). If one or more instructions are dispatched during the clock cycle, then stack control unit 44 allocates a register rename map for each instruction (step 86). Stack control unit 44 updates the allocated register rename maps in accordance with the register rename map at the top of the rename map stack 42 and the implemented register specifiers conveyed upon rename bus 52 (step 88). FIG. 6 illustrates step 88 in greater detail.

Turning now to FIG. 6, a flowchart illustrating the update of a register rename map corresponding to an instruction is shown. The steps shown in FIG. 6 are performed for each architected register, thereby forming a register rename map corresponding to the instruction.

Stack control unit 44 first considers whether or not the architected register is the destination of the instruction corresponding to the register rename map being updated (decision box 90). If the architected register is the destination of the instruction, then the implemented register specifier assigned by rename assign block 40 is stored in the register rename map for the architected register (step 92). If the architected register is not the destination of the instruction, then stack control unit 44 determines if a concurrently dispatched instruction which is prior to the instruction in program order updates the architected register (decision box 94). If a concurrently dispatched instruction does update the architected register, then the implemented register specifier assigned to the concurrently dispatched instruction is stored into the register rename map (step 96). Finally, if neither the instruction not a concurrently dispatched instruction update the architected register, then the implemented register specifier stored for the architected register in the register rename map at the top of the stack is assigned (step 98).

Figure 7:
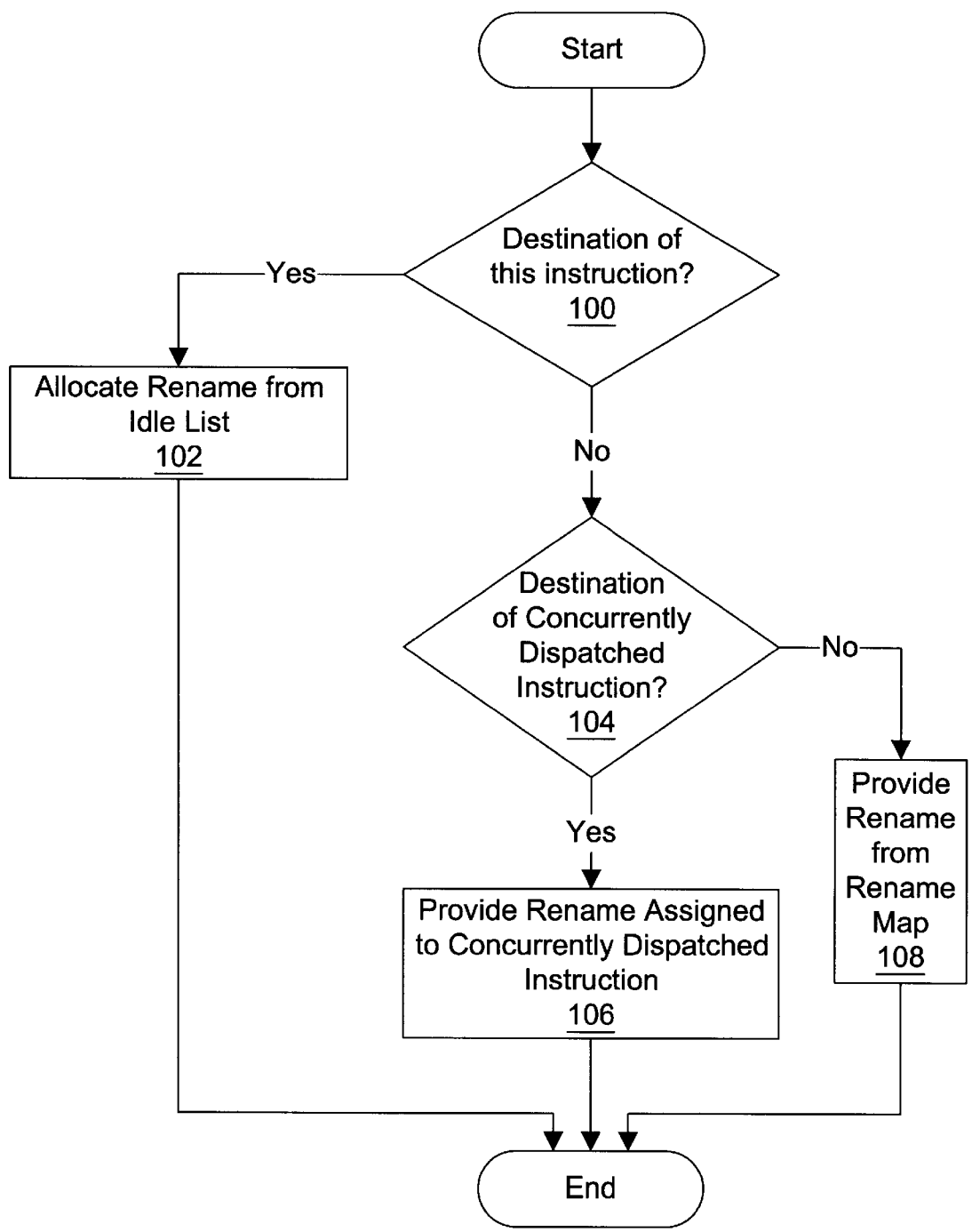
FIG. 7 is a flowchart depicting operation of one embodiment of a rename assign block shown in FIG. 2.

Turning next to FIG. 7, a flowchart illustrating operation of rename assign block 40 is shown. Rename assign block 40 performs the steps shown in FIG. 7 for each register operand for each instruction being concurrently dispatched by microprocessor 10.

If the register operand is a destination operand for the instruction, an implemented register specifier is assigned from a list of idle implemented registers maintained by rename assign block 40 (steps 100 and 102). A particular implemented register is removed from the idle list upon assignment to a particular instruction and is added to the idle list upon determination that an instruction subsequent to the particular instruction updates the same architected register as the particular instruction and the subsequent instruction is non-speculative. If the register operand is not the destination operand, then rename assign block 40 determines if the register operand is the destination of a concurrently dispatched instruction which is prior to the instruction in program order (step 104). If the register operand is the destination operand of the concurrently decoded instruction, then the implemented register specifier assigned to the concurrently dispatched instruction is provided for the register operand (step 106). On the other hand, if the register operand is not the destination of the concurrently decoded instruction, then the implemented register specifier stored for the architected register in the register rename map provided upon top map bus 48 is provided (step 108).

Figure 8:
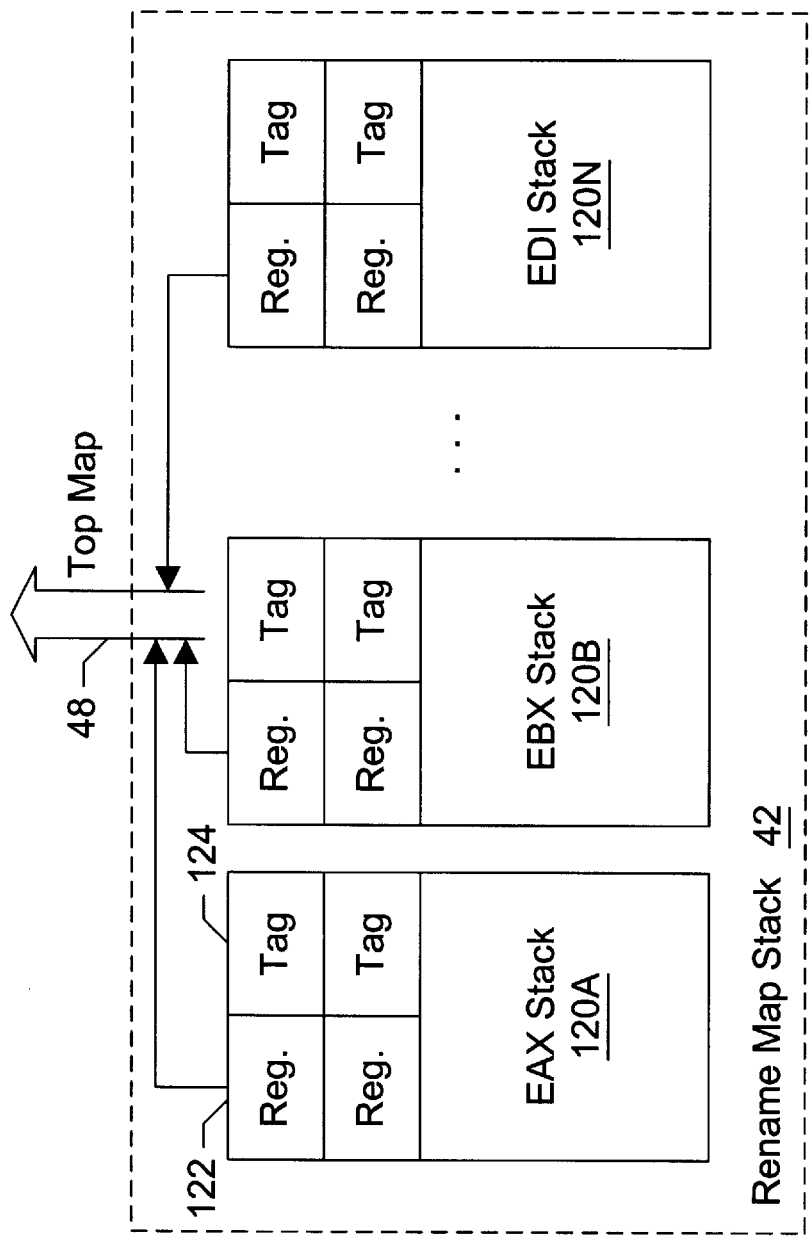
FIG. 8 is a block diagram of a second embodiment of the rename map stack shown in FIG. 2.

Turning now to FIG. 8, a block diagram of a second embodiment of rename map stack 42 is shown. In the embodiment of FIG. 8, an individual stack is included for each architected register. For example, an embodiment of microprocessor 10 employing the x86 microprocessor architecture includes an EAX stack 120A, an EBX stack 120B, etc. The top map of register rename stack 42 comprises the top entry of each of the individual stacks 120, as illustrated by the implemented register specifiers at the top of each individual stack 120 forming top map bus 48.

Each entry in individual stacks 120 comprises an implemented register specifier field 122 and a map tag field 124. Implemented register specifier field 122 stores the implemented register specifier assigned to the corresponding instruction, as well as the valid bit shown in FIG. 3. The executed bit may be stored as well, or the executed bit may be stored separately as noted above. Map tag field 124 stores the map tag assigned to the corresponding instruction.

In addition to storing implemented register specifiers assigned to the corresponding architected register, each individual stack 120 stores the map tag corresponding to the instruction which updates that implemented register. Upon detection of an exception, the map tags stored in individual stacks 120 are compared to the map tag of the instruction experiencing the exception to determine how many entries to pop from the corresponding individual stack. Entries are popped from each individual stack until an entry including a map tag of an instruction prior to the instruction experiencing the exception is found. In this manner, the register rename map corresponding to the instruction experiencing the exception is restored.

As an instruction is dispatched, the implemented register specifier assigned to the destination register operand of the instruction is pushed onto the corresponding individual stack 120A–120N. Other individual stacks 120A–120N are unmodified. The register rename map corresponding to the instruction is represented by the top entry in each individual stack 120A–120N upon dispatch of the corresponding instruction. In this manner, a register rename map corresponding to the instruction is stored for the instruction, but the additional storage used to store that register rename map is proportionally smaller than the storage used to store an entire copy of the register rename map. Instead of storing an entire copy of the register rename map including implemented register specifiers for each architected registers, only one entry of one of the individual stacks 120 is used. The remaining entries of the rename map are implicitly stored at the top of each of the remaining individual stacks 120. Advantageously, a register rename map corresponding to each instruction is stored in rename map stack 42, but the amount of storage actually used by each instruction is only one entry of one of the individual stacks 120. The embodiment shown in FIG. 8 may employ less total storage for storing a given number of register rename maps than the embodiment of FIG. 4, as long as each register is used as a destination with relatively equal frequency by the code sequence being executed by microprocessor 10.

For example, a code sequence which repeatedly uses the EAX register as a destination will experience a stack full situation in the embodiment of FIG. 8 when individual stack 120A becomes full, despite the fact that individual stacks 120B–120N are empty. The embodiment of FIG. 4 would not yet be full however, since space is allocated for a number of complete register rename maps in that embodiment. For more typical code sequences in which registers are used with more equal frequency, however, the embodiment of FIG. 8 may approach the performance attained by the embodiment of FIG. 4 while employing less total storage.

Figure 9:
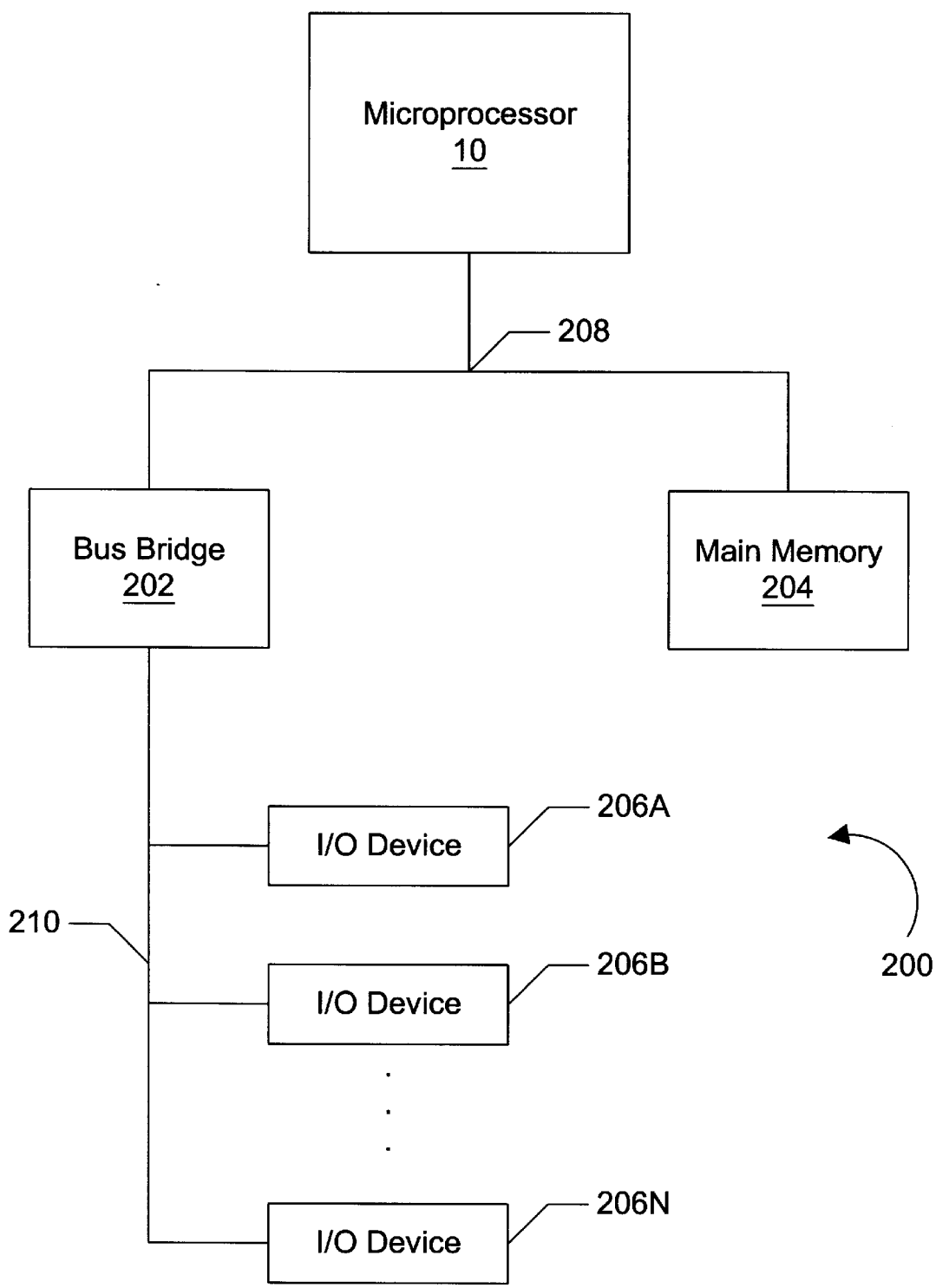
FIG. 9 is a block diagram of one embodiment of a computer system including the microprocessor shown in FIG. 1.

Turning now to FIG. 9, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 9 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

In accordance with the above disclosure, a microprocessor is shown which employs a rename map stack for recovering the state of a register rename map from an exception. The rename map stack stacks a register rename map corresponding to each instruction dispatched by the microprocessor. Upon detection of an exception, register rename maps corresponding to instructions subsequent to the instruction having the exception are popped from the stack. The register rename map at the top of the register rename stack is thereby restored to the register rename map corresponding to the instruction. In one embodiment, the register rename stack comprises individual stacks for each architected register. In this embodiment, storing a register rename map comprises pushing the implemented register specifier assigned to the destination of an instruction onto the corresponding individual stack. Less storage space is thus employed for storing each register rename map.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   a register file including a plurality of implemented registers, wherein a number of said plurality of implemented registers is at least equal to a number of architected registers specified by an instruction set employed by said microprocessor; and
   a register rename unit coupled to said register file, wherein said register rename unit is configured to maintain a set of register rename maps, and wherein each instruction within an instruction processing pipeline of said microprocessor corresponds to a different register rename map within said set, and wherein each register rename map within said set includes an implemented register specifier corresponding to each of said architected registers, and wherein said implemented register specifier identifies one of said plurality of implemented registers which corresponds to said architected register upon execution of said instruction corresponding to said register rename map and upon execution of instructions preceding said instruction in program order.

2. The microprocessor as recited in claim 1 wherein said set of register rename maps is stored in a stack, and wherein a top of said stack stores a particular register rename corresponding to a particular instruction which is last, in program order, among instructions within said instruction processing pipeline.

3. The microprocessor as recited in claim 2 wherein said register rename unit is coupled to receive a source operand specifier of a second instruction which is entering said instruction processing pipeline, and wherein said source operand specifier identifies one of said architected registers.

4. The microprocessor as recited in claim 3 wherein said register rename unit is configured to assign a corresponding implemented register specifier for said source operand specifier, wherein said corresponding implemented register specifier is stored in said particular register rename map.

5. The microprocessor as recited in claim 4 further comprising a reservation station coupled to said register rename unit, wherein said register rename unit is configured to convey said corresponding implemented register specifier to said reservation station, and wherein said reservation station is coupled to receive said second instruction.

6. The microprocessor as recited in claim 5 wherein said register rename unit is further configured to convey said corresponding implemented register specifier to said register file, whereby a source operand specified by said source operand specifier is read from one of said plurality of implemented registers identified by said corresponding implemented register specifier if said source operand is stored therein.

7. The microprocessor as recited in claim 6 wherein said reservation station is coupled to a result bus, and wherein said reservation station is configured to monitor said result bus for said source operation if said source operation is absent from said one of said plurality of implemented registers.

8. The microprocessor as recited in claim 3 wherein said register rename unit is coupled to receive a destination operand specifier of said second instruction, and wherein said destination operand specifier identifies one of said architected registers.

9. The microprocessor as recited in claim 8 wherein said register rename unit is configured to assign an idle implemented register for said destination operand.

10. The microprocessor as recited in claim 9 wherein said register rename unit is configured to add an additional register rename map to said set, and wherein said additional register rename map has implemented register specifiers for each architected register which are equal to said particular register rename map except for said architected register which is identified by said destination operand specifier, and wherein a second implemented register specifier corresponding to said idle implemented register is stored in said additional register rename map for said architected register specified for said destination operation specifier.

11. The microprocessor as recited in claim 10 wherein said register rename unit is configured to push said additional rename map onto said stack, whereby said particular rename map becomes second to said top of said stack, and whereby said additional rename map becomes said top of said stack.

12. The microprocessor as recited in claim 8 wherein said stack comprises a plurality of individually operable stacks, and wherein each one of said plurality of individually operable stacks corresponds to a different one of said architected registers, and wherein a top of each of said plurality of individually operable stacks comprises said top of said stack.

13. The microprocessor as recited in claim 12 wherein said register rename unit forms an additional register rename map corresponding to said second instruction by pushing a second implemented register specifier identifying a second implemented register assigned to said destination operand specifier onto one of said plurality of individually operable stacks corresponding to said architected register identified by said destination operand specifier.

14. The microprocessor as recited in claim 1 wherein said microprocessor is a superscalar microprocessor configured to execute multiple instructions per clock cycle.

15. A method for performing register renaming comprising:
   forming a register rename map corresponding to each instruction within an instruction stream being executed in a microprocessor, wherein said register rename map maps an implemented register assigned to said instruction to an architected register specified as a destination of said instruction, and wherein said register rename map retains a mapping of remaining architected registers to implemented registers as generated for instructions prior to said instruction in program order; and
   stacking said register rename maps corresponding to instructions within an instruction processing pipeline of said microprocessor in a rename map stack.

16. The method as recited in claim 15 further comprising removing one or more of said register rename maps from said rename map stack upon detection of an exception corresponding to a particular instruction.

17. The method as recited in claim 16 wherein said one or more of said register rename maps which are removed correspond to instructions subsequent to said particular instruction in program order.

18. The method as recited in claim 15 wherein said rename map stack comprises a plurality of stacks, and wherein each of said plurality of stacks corresponds to a different one of said architected registers.

19. The method as recited in claim 18 further comprising, upon assigning a particular implemented register as a rename for a particular architected register, pushing an implemented register specifier identifying said particular implemented register onto said one of said plurality of stacks corresponding to said particular architected register.

* * * * *